Nov. 12, 1968  R. D. JACOBS  3,410,630
MECHANICAL MOUNTING FOR LENS SYSTEM OF VARIABLE
ANAMORPHIC EYEPIECE
Filed Oct. 15, 1965  2 Sheets-Sheet 1
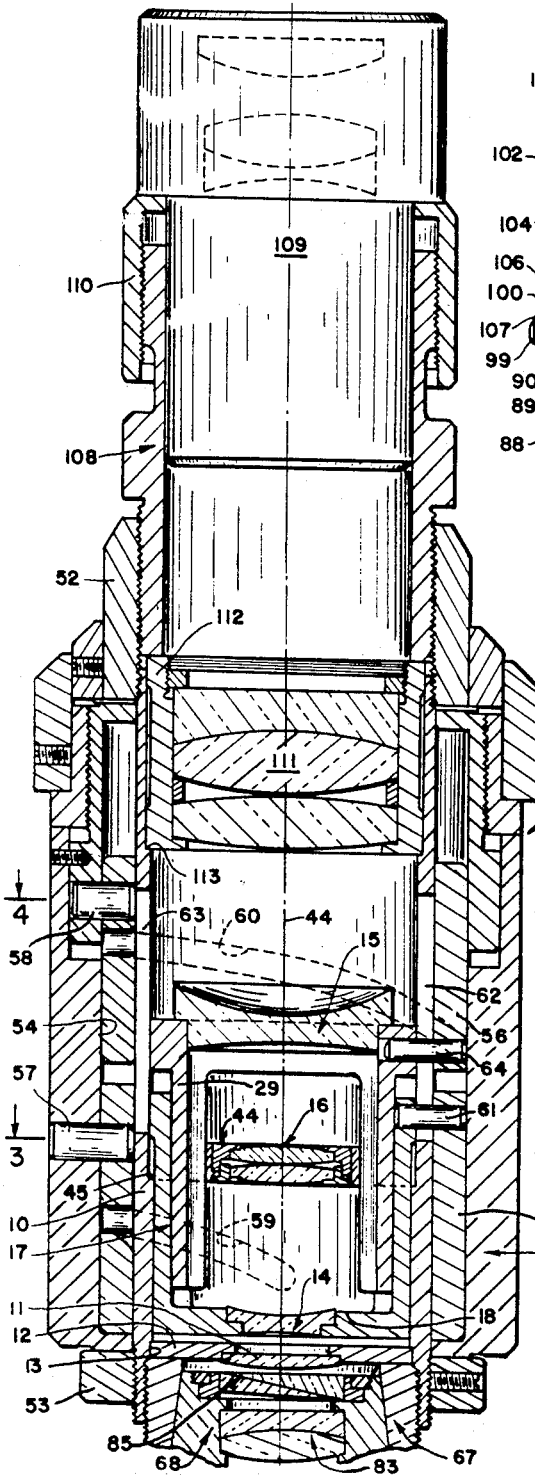
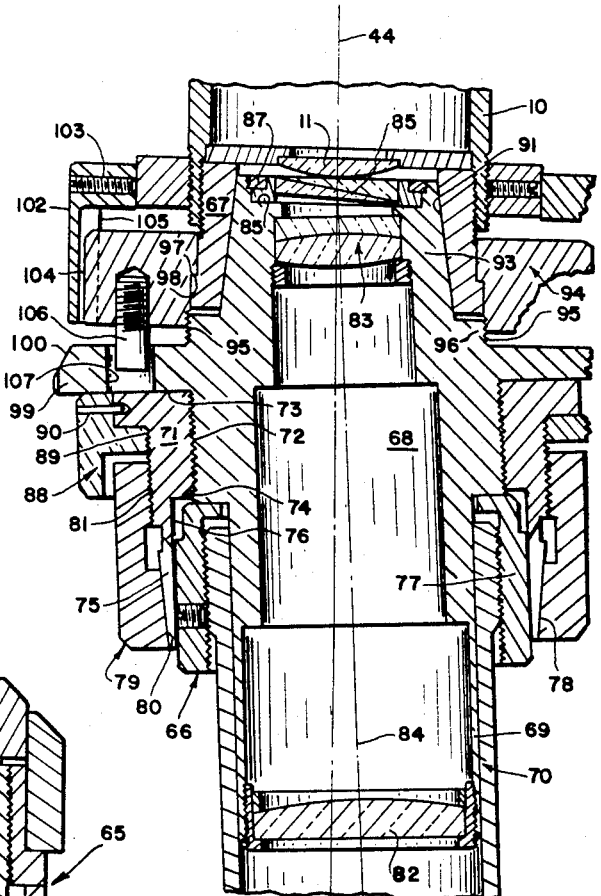
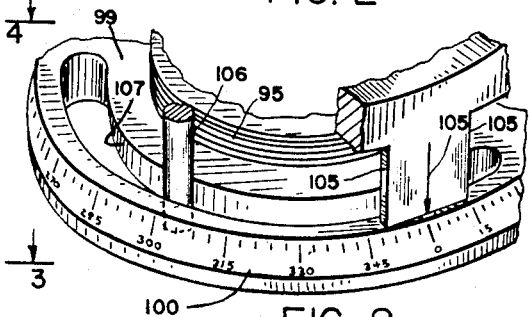
ROBERT D. JACOBS
INVENTOR.
BY Frank C. Parker
ATTORNEY

ROBERT D. JACOBS
INVENTOR.

ATTORNEY

United States Patent Office 3,410,630
Patented Nov. 12, 1968

3,410,630
MECHANICAL MOUNTING FOR LENS SYSTEM OF VARIABLE ANAMORPHIC EYEPIECE
Robert D. Jacobs, Livonia, N.Y., assignor to Bausch & Lomb Incorporated, Rochester, N.Y., a corporation of New York
Filed Oct. 15, 1965, Ser. No. 496,507
8 Claims. (Cl. 350—181)

The present invention relates to a mechanical mounting for the optical system of a variable anamorphic eyepiece and more particularly it relates to a mounting for a zoom type optical system therefor.

There are several kinds of visual instruments, such as microscope devices or other eyepiece equipped instruments, which utilize a stigmatic or anamorphosed image formed by either cylindrical lens elements or prismatic means. For some purposes, such as the photogrammetric comparison of stereodiapositives for instance, it is desirable to anamorphose the stereo images which are formed by the stereo eyepieces so that corresponding oblique features in the two diapositives may be properly fused. It is not only desirable that the shapes of said stereo images be the same, but it is also necessary that the size of said images be the same.

In view of the aforementioned requirements, it is an object of the present invention to provide a novel mounting mechanism for the optical system of an anamorphic eyepiece which is compact and efficient in structure to achieve minimum size and weight, said eyepiece being applied to a visual instrument to anamorphose the image produced thereby.

Another object is to provide such an eyepiece having a mechanism which incorporates movable lens cells for certain anamorphic lenses so that the images produced thereby may be progressively varied in magnification.

It is a further object of the present invention to provide a mounting mechanism for a variable anamorphic eyepiece which may be tilted sufficiently to adjust the interpupillary distance when two of such eyepieces are used together in a stereo instrument whose basic design utilizes converging or diverging optical paths.

A still further object is to provide such a device wherein the plane of unity magnification or plane of zero power of the anamorphosing lens members of the eyepiece may be rotated about their central axis of alignment to orientate the axis of magnification in different directions with respect to the object which is viewed.

A further object of the present invention is to provide such a device having its lens holding parts as well as the supporting and positioning structure therefor so constructed that each lens member may be axially adjusted relative to its related lens members so as to optimize the image forming properties of the optical system.

Further objects and advantages will be apparent to those skilled in the art by a study of the specification taken in connection with the accompanying drawings, wherein:

FIG. 1 is a substantially axial midsectional view of a preferred form of an eyepiece showing the upper section of the present invention, parts thereof being broken away;

FIG. 2 is a view similar to FIG. 1 showing the lower section of said eyepiece;

FIG. 8 is a partial perspective view partly broken away of certain details of the lens mounting mechanism.

Figure 3:
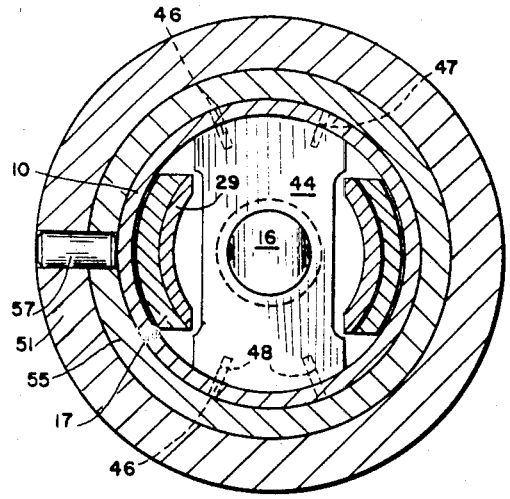
FIG. 3 is a sectional view taken on the line 3—3 of FIG. 1.
Figure 4:
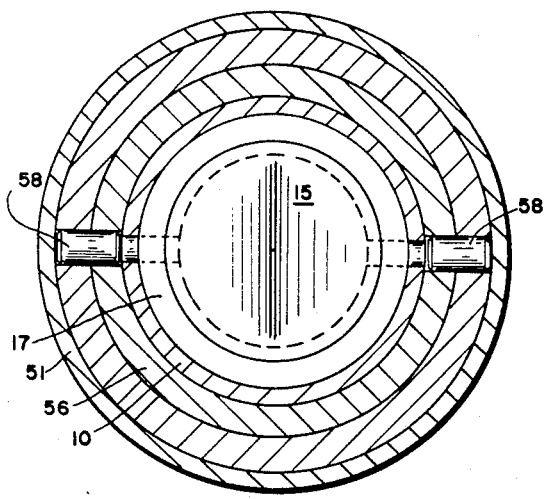
FIG. 4 is a sectional view taken on the line 4—4 of FIG. 1.

The mechanism described herebelow serves as mounting means for a zoom or variable magnification anamorphic lens system whereby the image may be expanded along a single axis transversely of the alignment axis of said system, the system being disclosed per se in the previously filed patent application, Ser. No. 442,928, in the name of Carpenter et al., filed March 26, 1965. Said mechanism is divided into several functional groups in the description herebelow.

The variable magnification mechanism

Structurally, the variable magnification mechanism is carried by an elongated body tube 10 wherein a stationary cylindrical anamorphic lens 11 is held at its lower end. Lens 11 is retained by any suitable means such as cement in a disk-shaped lens cell 12 which is demountably secured in a counterbore 13 formed in tube 10 by an annular support member 67 to be described hereinafter.

Figure 5:
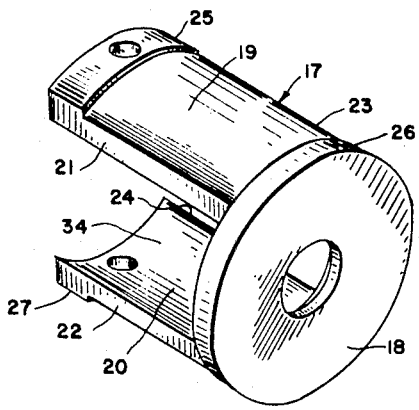
FIG. 5 is a perspective view of a lens holder of said eyepiece.

One of the novel features of the present invention concerns the means for mounting the two movable cylindrical anamorphic lenses 14 and 15, and also the second stationary anamorphic lens 16. Said means comprises an intermediate tubular sleeve or shell 17 shown per se in FIG. 5 having a cross-wall 18 formed at its lower end wherein is fixed in any preferred manner the lower movable anamorphic lens 14. Sleeve 17 is slidably fitted onto the inner surface of the body tube 10 as shown in FIG. 3, said sleeve being characterized by two opposite side cheeks or arcuate and axially extending portions 19 and 20 which contact said inner surface whereby the movable lens 14 is held truly normal to the tube 10 during its entire excursion.

Means for forming two substantially parallel-sided open spaces or recesses in the outer sleeve 17 are provided, said spaces being aligned opposite to each other between the arcuate side cheeks 19 and 20. Extending along the longitudinal margins of the arcuate side cheeks 19 and 20 are two pairs of longitudinal walls 21, 22 and 23, 24. The walls 21, 22 on one side of said cheeks preferably are flat and coplanar and extend parallel to the similarly constructed walls 23, 24 formed on the other side thereof. For the purpose of reducing the frictional resistance to movement, the outer surfaces of the sleeve 17 have shortened arcuate contact areas 25 and 27 and a circular surface 26 formed thereon slightly larger in diameter than the intervening areas of 19 and 20.

Figure 6:
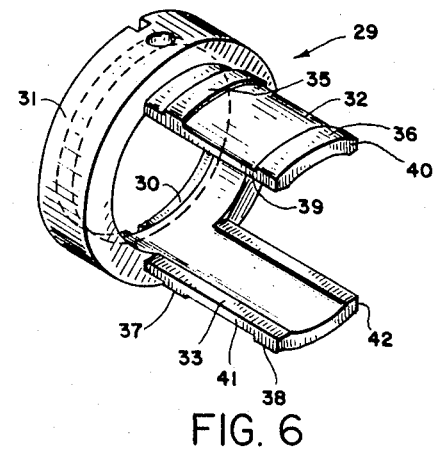
FIG. 6 is a perspective view of another lens holder comprised in the eyepiece.
Figure 7:
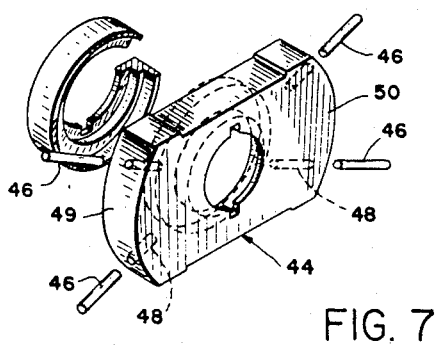
FIG. 7 is a perspective view partly broken away of certain lens holding parts shown in FIG. 1.

For mounting the second or upper movable anamorphic cylindrical lens 15, a movable tubular inner sleeve 29 is provided having a counterbore 30 wherein said lens 15 is secured in any preferred manner such as cementing, as shown in FIGS. 1 and 6. The inner sleeve 29 is provided with a head portion 31 which fits freely within the body tube 10 and on said head portion is formed a pair of arcuate longitudinal members 32, 33 which are slidably fitted to the interior surface 34 of the intermediate sleeve 17. On the opposite ends of the arcuate members 32, 33 are formed small arcuate contact areas 35, 36, 37, 38 of slightly larger diameter whereon the inner sleeve rests. Along the opposite margins of the arcuate members 32, 33 are formed two pairs of longitudinal walls 39, 40 and 41, 42 which are preferably flat in shape and parallel to each other as shown in FIG. 6. Said longitudinal walls 39, 40, 41, 42 form the longitudinal boundaries of a pair of wide opposite open spaces separating each pair of walls, and said spaces are aligned with and generally correspond to the longitudinal walls 21, 22, 23, 24 formed on the intermediate sleeve 17 for a purpose to be described hereinafter. The open end of the intermediate sleeve 17 admits the inner sleeve 29 so that these parts are telescoped together and the lower end of sleeve 29 is also open interiorly.

Between the two movable anamorphic lenses 14 and 15, a cross member 44 is provided wherein is mounted the second stationary anamorphic lens member 16, said cross member extending freely through the aforesaid open spaces in the sleeves 17 and 29 and being anchored longitudinally against a shoulder 45 formed on the interior walls of the body tube 10. The cross member 44 is anchored therein preferably by a plurality of pins 46 which are closely fitted in corresponding openings 47, shown in FIG. 3, formed in the body tube 10 and other openings 48 formed in the cross member. The end surfaces 49, 50 of the cross member 44 are formed arcuately to conform to the inner walls of the body tube 10 adjacent to the shoulder 45.

Mechanism is provided for moving the cylindrical lenses 14 and 15 along the axis 44 simultaneously in such a manner that the magnification of the anamorphosed image is varied continuously. Such mechanism comprises an actuator sleeve 51 which is rotatably carried on the outer diameter of the body tube 10. Sleeve 51 is restrained from axial movement by a pair of positioning collars 52, 53 which abut against the opposite ends of the actuator sleeve 51 and are preferably threaded and locked onto the body tube 10. In the actuator sleeve 51 is formed a cylindrical interior recess 54 wherein is freely held a front cam sleeve 55 and a rear cam sleeve 56 which are secured to the actuator sleeve by respective dowel pins 57 and 58.

In the front and rear cam sleeves 55 and 56 are formed cam slots 59, 60 respectively, as indicated in FIG. 1, and said slots are formed with differential axial components so that the simultaneous rotation thereof effects a progressive magnification of the image formed by the cylindrical lenses 11, 14, 15 and 16 while maintaining the axial position of the image substantially stationary. A drive connection is provided between the cam slots 59 and the intermediate lens carrying sleeve 17 in the form of a cam follower pin 61 which is fixed radially in the upper end of the sleeve so as to project through longitudinal slots 62 and 63 formed in the body tube 10 and engage in the cam slot 59. Likewise, a second cam follower pin 64 is fixed axially in the upper end of the inner sleeve 29 which carries lens 15 so as to project through the aforesaid longitudinal slot 62 and engage in the cam slot 60, the slot 62 serving to prevent rotation of the lens carrying sleeves when acted on by the respective cam follower pins.

Eyepiece mounting chuck

With particular reference to FIG. 2, an adapter or chucking mechanism is there illustrated which serves to securely clamp the anamorphic eyepiece, which is generally designated by numeral 65, onto a conventional instrument eyepiece 66 so as to provide the aforementioned anamorphic function for the instrument whereon it is mounted.

The chucking mechanism is carried by an annular support member 67 which is fixed in the lower end of the body tube 10 by means of threads formed cooperatively on the tube and member. An elongated chuck member 68 is held as hereinafter set forth in the support member 67, the lower end 69 of member 68 being tubular in shape and being slidably fitted to be received in a conventional eyepiece tube 70. Between the lower end 69 and the support member 67 is fixed a hardened and spring tempered collet member 71 by any preferred means such as the threads 72 which are cooperatively formed on members 71 and 68 and terminate at the upper end in a radial shoulder 73 against which the collet member is firmly seated. The collet member 71 is locked on the chuck member 68 preferably by upsetting the threads 72 at 74. On the lower end of the collet member 71, a plurality of collet fingers 75 are formed which are somewhat resilient. The interior surface 76 of the collet fingers 75 together forms a recess wherein a conventional eyepiece cap 77 is received freely.

Means for clamping or chucking the collet fingers 75 against the outer surface of the eyepiece cap 77 are provided including a tapered outer surface 78 formed on the collet fingers and a clamp nut 79 which has a corresponding tapered surface 80 matching surface 78. On the other end of the clamp nut 79, a thread is formed which engages with threads 81 formed on the shank of the collet member 71 whereby the nut may be drawn against the tapered fingers 75 to close the chuck.

Within the tubular portion 69 is secured in any preferred manner such as threading, a pair of relay lenses 82 and 83 which together collimate the image rays ahead of the cylindrical anamorphic lenses 11, 14, 15 and 16.

The pupillary distance adjustment

Since any change of pupillary distance for the operator involves motion of the upper end of the eyepiece, this motion is secured by angualrly offsetting the axis 44 as shown at 84. To secure this result optically, a suitable deviating prism 85 is seated in a recess 86 formed in the upper end of the chuck member 68 to deviate the axis 84 along the axis 44. The prism 85 is held in the accommodating recess 86 by a retainer ring 87.

A knurled ring 88 is fixed onto the periphery of the collet member 71 in any preferred manner such as the threads 89 and lock pin 90 to assist in adjusting the interpupillary distance of the anamorphic eyepiece 65 when two such devices are used in a stereo instrument. The operator grasps the ring 88 and unscrews the collet nut 79 to release the chuck fingers 75. Then the anamorphic eyepiece 65 is rotated on the instrument eyepiece cap 77 until the desired interpupillary distance is obtained, care being taken to position each eyepiece 65 in corresponding symmetrical positions with respect to the central axis of the binocular instrument on which it is used.

Orientation mechanism for the axial plane of zero power of the cylindrical lens surfaces In order to rotate the plane of zero power of the cylindrical surfaces of lenses 11, 14, 15 and 16, or as alternatively expressed, the plane of magnification of the anamorphosing lenses, a rotation joint is formed by a tapered bore 91 in the annular support member 67 wherein is fitted a like tapered end 93 on the chuck member 68, so that the body tube 10 may be rotated with respect to the instrument eyepiece 70.

Locking means are provided to immobilize said rotation joint comprising a lock ring 94 which is threaded at 95 onto a boss 96 formed on the adjacent chuck member 68. Further, the locking means comprises a pair of abutment shoulders 97, 98 formed in abutting relation to each other on the lock ring 94 and chuck member 68 respectively so that locking friction is applied to said abutment shoulders when the lock ring is screwed onto the threads 95.

For indicating the relative angular position of the parts 67 and 68 of the rotation joint, a wide flange 99 is formed on the chuck member 68 whereon an angular scale 100 is produced. Cooperating with the scale 100 is an index mark 101 which is formed on a ring 102 located closely adjacent thereto and held by releasable means such as a set screw 103 in fixed relation to the stationary parts of the mounting to which the support ring 67 is attached. As shown in FIG. 2, the ring 102 overlays the lock ring 94 but accessibility to the knurled rim 104 is provided by cutting away large portions of the rim as indicated at 105 in FIG. 8.

To prevent damage due to overstressing the rotation joint locking mechanism, a limited range of rotation of the lock ring 94 is provided comprising a protruding pin 106 which engages in an arcuate slot 107 formed in the wide flange 99 as shown in FIG. 8.

On the upper end of the body tube 10 is fixed a tubular extension 108 by means of the positioning collar 52 wherein it is threaded which also serves as a coupling member. Slidably fitted on the inner wall of the extension 108 is a conventional eyepiece 109 of suitable optical properties, said eyepiece resting on a focusing ring 110 of conventional construction for regulating the focused position thereof.

Between the eyepiece 109 and the anamorphosing cylindrical lens system is mounted a second relay lens 111 by means of a lens cell 112 which is fitted to the inner surface of the body tube 10 and is clamped between a shoulder 113 formed in said inner surface and the extension 108.

*The axial regulation of anamorphic lens system*

In regulating the axial position of the entire anamorphic lens system 11, 14, 15, 16 during assembly or at other times, the positioning collars 53 and 52 which abut the ends of the anamorphic lens actuating sleeve 51 are moved in a coordinated manner in an axial direction until the focal planes of the anamorphic lens systems are properly fused with the focal planes of the adjacent relay lens system 82, 83 after which the positioning collars 52 and 53 are again locked in place. For this purpose the collar 52 is locked in place by using the extension 108 as a locking device as shown in FIG. 1 in addition to its other described functions.

From the foregoing description it will be seen that there is here provided a mounting for a variable anamorphic lens system which is ingeniously conceived to comprise many multipurpose parts for obvious advantages in simplicity, minimum weight and compactness along with complete adjustability of all its functional parts, the parts of the mounting being so constructed as to operate easily and reliably without complication.

Although only a preferred form of the present invention is shown and described in detail, the parts thereof may be in different forms and arrangements and the detailed shapes of the parts may be varied without departing from the spirit of the invention as defined in the appended claims.

I claim:

1. A mechanical mounting for the lens systems of an anamorphic zoom type of variable magnification eyepiece used on a visual instrument, said mounting having in combination an elongated body tube, a lens cell fixed in one end of said tube wherein a stationary anamorphosing lens is held, a movable intermediate sleeve fitted slidably for axial motion within said body tube, said sleeve carrying a first movable anamorphic lens in optical alignment with said stationary lens, a movable inner sleeve fitted for slidable axial motion along the inner surface of the first movable sleeve, said inner sleeve having a second movable anamorphic lens mounted therein in optical alignment with the aforesaid lenses, a pair of mutually spaced longitudinal walls formed through one side of both of said movable sleeves and a second pair of mutually spaced longitudinal walls formed through the opposite side of both movable sleeves so as to provide two wide longitudinal open spaces which are transversely aligned with each other, means including a cross member fixed laterally within said body tube and extending freely through said openings for supporting a second stationary anamorphic lens, and means operatively formed on the exterior of said tube and connected therethrough to both of the interior movable sleeves for moving the sleeves to anamorphose and vary the magnification of an image along one transverse axis formed by said lens system.

2. A mechanical mounting for the lens system of an anamorphic zoom type of variable magnification eyepiece used on a visual instrument, said mounting having in combination an elongated body tube, a lens cell fixed in said tube near one end thereof wherein a stationary cylindrical anamorphosing lens is held, a movable sleeve fitted for axial motion within said body tube wherein is held a movable anamorphic lens in optical alignment with said stationary lens, an inner movable sleeve fitted for axial motion slidably along the inner surface of the first movable sleeve, the inner sleeve having fixed therein a second movable anamorphic lens in optical alignment with the other lenses, means for forming a parallel-sided open-ended recess transversely of a major portion of said first movable sleeve, the open end being farthest from the first movable lens, means for forming a second parallel-sided open-ended recess transversely of a major portion of said first movable sleeve, the open end thereof being nearest to said first movable lens, a cross member whereon is mounted a stationary anamorphic lens member transversely of said tube between the aforesaid movable lens members, said cross member having formed thereon two opposite circular peripheral portions which are fitted to and are fixed to the interior surface of said body tube, a pair of connecting sides formed on the cross member between said circular portions, the dimension between said sides being substantially less than the transverse dimension between the parallel sides of either of said recesses so that relative axial motion between said sleeves and cross member is possible, and means operatively formed for moving both of said movable sleeves simultaneously whereby an image transmitted through said lens members may be compressed or expanded along one transverse axis continuously by a varied amount.

3. A mechanical mounting for the lens system of an anamorphic zoom type of variable magnification eyepiece used on a visual instrument, said mounting having the combination of an elongated body tube, an annular support member secured in one end of said tube and projecting therebeyond whereon a system of spherically surfaced relay lenses is held, a chuck member operatively constructed on and carried by the support member so as to receive and firmly grip an element of said visual instrument whereby the eyepiece is optically aligned with the instrument, a lens cell fixed in said tube adjacent to said support member, said cell having mounted therein a stationary anamorphosing lens, an intermediate movable sleeve fitted for axial motion within said body tube, said sleeve having fixed therein a movable anamorphosing lens in alignment with said stationary anamorphosing lens, an inner movable sleeve fitted for slidable axial motion along the inner surface of the first movable sleeve, said inner sleeve having fixed therein a second movable anamorphosing lens in optical alignment with the other lenses, means for forming a parallel-sided open-ended recess transversely of a major portion of said first movable sleeve, the open end being farthest from the first movable lens, means for forming a second parallel-sided and open-ended recess in the inner movable sleeve, the open end thereof being nearest to said first movable lens, a cross member for mounting a stationary anamorphic lens member transversely of said tube between the aforesaid movable lens members, said cross member having formed thereon two opposite circular peripheral portions which are fitted to and are fixed to the interior surfaces of said body tube, a pair of connecting sides formed on the cross member between said circular portions, the dimension between the sides being substantially less than the transverse dimension between the parallel sides of either of said recesses so that relative axial motion between said sleeves and cross members is possible, a rear lens cell fixed in the rear part of said body tube for holding a rear spherically surfaced relay lens system which forms an image at a fixed position rearwardly thereof, means operatively formed for moving both of the movable sleeves simultaneously to effect an anamorphosing change of variable degree in the image produced by the lens members.

4. A mechanical mounting for the lens system of an anamorphic zoom type of variable magnification eyepiece used on a visual instrument, said mounting having in combination an elongated body tube, a lens cell fixed in said tube near one end thereof wherein a stationary cylindrical anamorphosing lens is held, an intermediate movable sleeve fitted for axial motion within said body tube wherein is held a movable anamorphic lens in optical alignment with said stationary lens, an inner movable sleeve which projects at the rear beyond the intermediate sleeve and is fitted for axial motion slidably along the inner surface of the first movable sleeve, the inner sleeve having fixed therein a second movable anamorphic lens in optical alignment with the other lenses, means for forming a parallel-sided open-ended recess transversely of a major portion of said first movable sleeve, the open end being farthest from the first movable lens, means for forming a second parallel-sided open-ended recess transversely of a major portion of said first movable sleeve, the open end thereof being nearest to said first movable lens, a cross member whereon is mounted a stationary anamorphic lens member transversely of said tube between the aforesaid movable lens members, said cross member having formed thereon two opposite circular peripheral portions which are fitted to and are fixed to the interior surface of said body tube, a pair of connecting sides formed on the cross member between said circular portions, the dimension between said sides being substantially less than the transverse dimension between the parallel sides of either of said recesses so that relative axial motion between said sleeves and cross member is possible, a front cam sleeve and a rear cam sleeve slidably journaled in spaced relation to each other on the outer diameter of said body tube, a pair of helix-like parallel spaced cam surfaces forming a cam slot in each of the front and rear cam sleeves, a pair of flat parallel spaced guide surfaces forming a longitudinal slot in the proximity of each of the helix-like slots in said body tube, a cam follower pin fixed radially in said intermediate sleeve so as to engage in said longitudinal slot and in the helical slot of the front cam sleeve, a second cam follower pin fixed radially in the extended portion of the inner sleeve so as to engage slidably in said longitudinal slot and project outwardly into the helical cam slot in the rear cam sleeve, and an actuator sleeve carried by said body tube and rotatably connected to the front and rear cam sleeves for actuating said sleeves to anamorphose the image produced by the lenses.

5. A mechanical mounting for the lens system of an anamorphic zoom type of eyepiece as set forth in claim 3 wherein said means for moving said movable sleeves includes a front and a rear cam sleeve slidably journaled in spaced relation to each other on the outer diameter of said body tube, a pair of parallel spaced cam surfaces formed substantially helically in each sleeve so as to constitute a cam slot, a pair of axially directed parallel spaced walls forming a longitudinal slot in said body tube across both cam slots, a cam follower pin fixed in said outer cam sleeve so as to project radially through said longitudinal slot and engage in the cam slot of said front cam sleeve, a second cam follower pin fixed radially near the rear end in said inner sleeve so as to project through said longitudinal slot and engage in the cam slot of said rear sleeve, and an actuating sleeve rotatably carried on the outside diameter of said body tube and operatively connected to simultaneously rotate the front and rear sleeves, whereby rotation of the actuating sleeve causes the image formed by said lenses to compress or enlarge the image formed thereby along one transverse axis.

6. A mechanical mounting for a lens system which is used with a visual instrument by which the image may be formed with varying degress of anamorphosing effect, said mounting having in combination an elongated body tube, a lens holding member fixed in one end of said tube and having a stationary first cylindrical lens mounted therein, a first movable lens holding member slidably fitted for movement on the inner diameter of said tube near said stationary cylindrical lens, said member having two opposite curved and mutually spaced side cheeks in contact with said inner diameter and having a second cylindrical lens mounted therein of opposite sign to the first cylindrical lens, a cylindrical bearing surface formed internally on said cheeks concentrically with its outer surface, a second movable lens holding member fitted slidably for axial movement on the interior bearing surface of said cheeks, said second movable member having two opposite spaced side cheeks which face the side cheeks of the first movable lens holding member so as to provide a clear and open space therebetween, said second movable member having a third cylindrical lens mounted therein of the same sign as the second cylindrical lens, means including a cross member fixed laterally to the inner diameter of said body tube and extending freely through the aforesaid open space between said side cheeks for mounting a fourth cylindrical lens which has the same sign as the first movable lens and has the opposite sign to the movable lenses, all of the cylindrical lenses being aligned symmetrically with respect to a common axial plane of the radii of the cylindrical surfaces, means operatively formed on the exterior of said tube and connected therethrough to both of the interior first and second movable lens holding members for moving the members axially to variably anamorphose the image formed by the cylindrical lenses, an annular support member fixed to said body tube adjacent to the first lens holding member, a chuck mechanism carried by said support member and operatively constructed to receive and firmly grip an element of said visual instrument so that the optical alignment of the instrument and eyepiece is coextensive, and means cooperatively formed on said annular support member and said chuck mechanism for providing a rotation joint between the last two said members which is concentric with the axis of said cylindrical lens system.

7. A mechanical mounting for the lens system of an anamorphic zoom eyepiece which is used with a visual instrument as set forth in claim 6, said mounting being further characterized by said rotation joint including
- a bored chuck-holding sleeve, and means in the bore of the sleeve for holding a spherically surfaced front lens system in optical alignment with said cylindrical lenses,
- a tapered rotation joint formed cooperatively on said annular support member and chuck-holding sleeve with the largest diameter of the tapered joint being located farthest from the first cylindrical lens,
- a lock ring for immobilizing said tapered joint,
- a cylindrical outer surface whereon said lock ring is journaled, said cylindrical outer surface being formed on said annular support member and terminating in a radial shoulder which faces the small end of said joint,
- an annular abutment surface formed on said ring in abutting relation to said radial shoulder, and
- thread means cooperatively formed on said chuck-holding sleeve and said ring for drawing the sleeve toward the ring to immobilize said joint tapered joint.

8. A mechanical mounting for a lens system which is used with a visual instrument by which the image may be formed with varying degrees of anamorphosing effect, said mounting having in combination
- an elongated body tube,
- a lens holding member fixed in one end of said tube and having a stationary first cylindrical lens mounted therein,
- a first movable lens holding member slidably fitted for movement on the inner diameter of said tube near said stationary cylindrical lens, said member having two opposite curved surfaces and mutually spaced side cheeks in contact with said inner diameter and having a second cylindrical lens mounted therein of opposite sign to the first cylindrical lens,
- a cylindrical bearing surface formed internally of said cheeks concentrically with its outer surface,
- a second movable lens holding member fitted slidably for axial movement on the interior surface of said extensions, said second movable member having two opposite spaced side cheeks which face the first said side cheeks and provide a clear and open space therebetween, said second movable member having a third cylindrical lens mounted therein of the same sign as the second cylindrical lens,
- means including a cross member fixed laterally to the inner diameter of said body tube and extending freely through the aforesaid open space between said side cheeks for mounting a fourth cylindrical lens which has the same sign as the first movable lens and has the opposite sign to the movable lenses, all of the cylindrical lenses being aligned symmetrically with respect to a common axial plane of the radii of the cylindrical surfaces,
- means operatively formed on the exterior of said tube and connected therethrough to both of the interior first and second movable lens holding members for moving the members axially to variably anamorphose the image formed by the cylindrical lenses,
- an annular support member fixed in the end of said tube adjacent to the first lens holding member,
- a chuck holding sleeve carried by said support member, said sleeve being clamped onto an element of a visual instrument in optical alignment therewith,
- means defining an open passage through the length of the chuck holding sleeve, the axis thereof being inclined to the axis of the cylindrical lenses so as to incline the eyepiece,
- a relay lens system operatively secured in said passage so as to relay an image from said instrument to said cylindrical lenses,
- means cooperatively formed on said annular support member and said chuck holding sleeve for providing a rotation joint therebetween, the axis of said joint being concentric with said chuck holding sleeve and said relay lens system, and
- a deviation prism secured in the end of said chuck holding sleeve between said relay lens system and said cylindrical lenses for deviation of the optical axis of said relay system in the direction of the axis of the cylindrical lenses whereby the observer's end of said eyepiece may be moved laterally for facilitating use of the instrument.

References Cited

UNITED STATES PATENTS 3,015,988   1/1962   Hemstreet _____ 350—181

JOHN K. CORBIN, *Primary Examiner.*